J. W. THOMPSON.
SHIELD FOR DRIVING GEAR OF MOTOR VEHICLES.
APPLICATION FILED APR. 12, 1912.
1,055,101.                                                Patented Mar. 4, 1913.
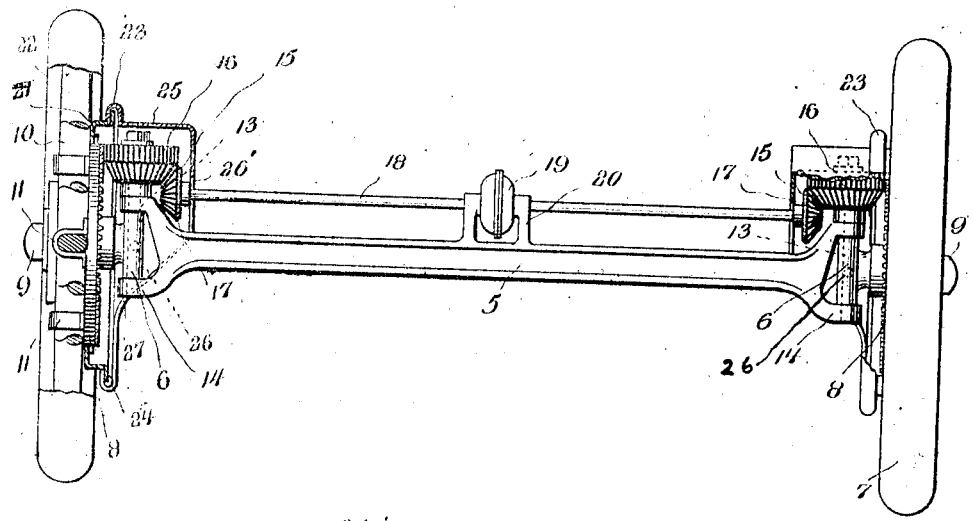
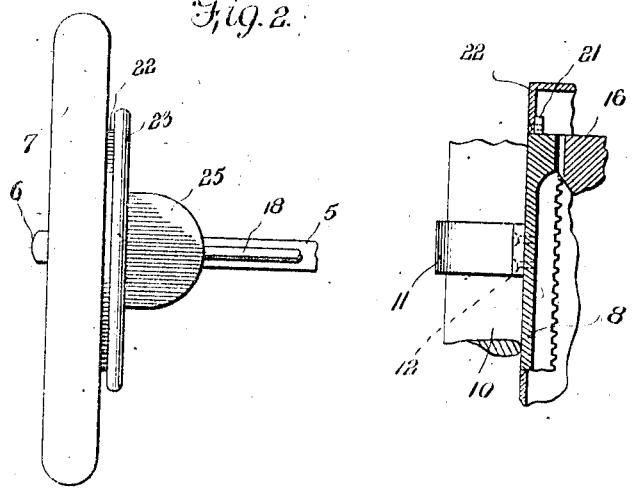
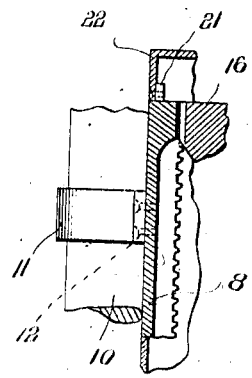
Witnesses
Inventor
John W. Thompson.
By Victor J. Evans
Attorney

UNITED STATES PATENT OFFICE.

JOHN W. THOMPSON, OF BRENT, ALABAMA.

SHIELD FOR DRIVING-GEAR OF MOTOR-VEHICLES.

1,055,101.

Specification of Letters Patent.   Patented Mar. 4, 1913.

Application filed April 12, 1912. Serial No. 690,282.

*To all whom it may concern:*

Be it known that I, JOHN W. THOMPSON, a citizen of the United States, residing at Brent, in the county of Bibb and State of Alabama, have invented new and useful Improvements in Shields for Driving-Gear of Motor-Vehicles, of which the following is a specification.

The invention relates to shields for driving gear of motor vehicles, and has for its primary object to provide a shield wherein the driving gear will be inclosed so as to protect the same from dirt, sand, or other foreign matter while the motor vehicle is traveling.

Another object of the invention is the provision of a shield of this character which will fit about the knuckle joint between the front axle and wheel of a motor vehicle so as to protect the driving gear and at the same time will not interfere with the rotation of the wheel or the steering thereof.

A further object of the invention is the provision of a shield which is simple in construction, readily and easily applied about the driving gear, thoroughly reliable and efficient in its purpose, and inexpensive in manufacture.

With these and other objects in view the invention consists in the construction, combination and arrangement of parts as will be hereinafter more fully described, illustrated in the accompanying drawings, and pointed out in the claim hereunto appended.

In the drawings:—Figure 1 is a front elevation of a stationary front axle, the steering knuckles and steering wheels of a motor vehicle, showing the driving gear constructed in accordance with the invention applied thereto, one of the steering wheels being broken away, and also the casings for the gear connections being shown partly in section. Fig. 2 is a fragmentary top plan view thereof. Fig. 3 is an enlarged fragmentary vertical sectional view through one of the steering wheels showing the gear connections associated therewith.

Similar reference characters indicate corresponding parts throughout the several views in the drawings.

Referring to the drawings by numerals, there is merely shown the stationary front axle 5, the turning knuckles 6, and the steering wheels 7 of a motor vehicle of any ordinary type, to illustrate the manner of application and the construction of the driving gear as will be hereinafter more fully described. The driving gear comprises a pair of crown tooth gears 8, each being mounted on the inner side of the steering wheels 7 which is journaled upon the axle spindle or stub 9 of the turning knuckle 6 as usual, the gear 8 being detachably secured to the spokes 10 of the said steering wheel by means of band clips 11 surrounding the said spokes 10 and are fixed to the gear 8 through the medium of the removable screws 12. In this instance each gear 8 is shown of the solid type although the same may be made of the skeleton type or in any other manner found desirable.

Rotatably connected to the upper ends of the knuckle pins 13 which are passed through the forks 14 of the stationary axle 5 and the turning knuckle 6 are beveled pinions 15 having integral therewith the cog gears 16 which mesh with the gears 8, while meshing with the beveled pinions 15 are further beveled pinions 17, the same being fixed to the outer ends of driven shafts 18 having interposed therebetween the usual differential contained within the differential casing 19 which is supported by and between vertical uprights 20 formed on and rising from the stationary axle 5, the differential gearing within the casing 19 being connected with and driven from the engine or motor or vehicle in the ordinary well-known manner so that power may be transmitted from the engine directly to the steering wheels 7 of the said vehicle.

Formed at intervals on and projecting outwardly from the periphery of each gear 8 are ears or lugs 21 to which is connected an outer circular-shaped shield section 22 the same being formed with an out-turned annular locking flange 23 loosely engaging for rotation in a channeled circular raceway 24 formed on the inner section 25 of a guard casing, the latter being mounted upon and supported by braces or arms 26 fixed to and projecting rearwardly and forwardly from the turning knuckle 6 so that on the turning of the latter the said inner section 25 of the casing will move therewith, and likewise the outer section 22 by reason of its connection with the steering wheel 7 will simultaneously move with the said casing. The casing at the inner section 25 thereof is formed with cut-away portions or slots 26' and 27 respectively, which are of a size to accommodate the shaft 18 and the axle 5 so that they will not interfere with the free turning movements of the steering wheel when guiding the motor vehicle in its travel.

The casing will exclude dirt, mud and foreign matter from the gearing and all of the adjunct working parts of the driving gear. It will be apparent that by reason of the particular mounting of the driving gear the same will possess maximum strength, thereby assuring durability and also by reason of the simplicity of construction there will be no possibility of the derangement of the parts, and in this manner a positive drive from the engine to the steering wheels will be assured at all times. Furthermore, it is to be understood that by the arrangement of the driving gear it will not interfere with the driving of the rear wheels of the motor vehicle either by chain connection or gearing in the ordinary well-known manner.

It is of course to be understood that changes and variations and modifications may be made in the invention, such as come properly within the scope of the appended claim, without departing from the spirit or sacrificing any of the advantages of the said invention.

What is claimed is:—

The combination with a knuckle joint having a spindle, a wheel rotatably mounted thereon and gears on the wheel and knuckle joint and meshing with each other, of a housing comprising a circular shaped shield section mounted on the wheel concentrically to the said gear thereon and adapted to rotate therewith and having an out-turned flange, and a guard casing inclosing the gear on the knuckle joint and having an annular channeled rim forming a raceway receiving the out-turned flange on the shield section for connecting the latter and the guard casing together.

In testimony whereof I affix my signature in presence of two witnesses.

JOHN W. THOMPSON.

Witnesses:
E. EDMONSTON, Jr.,
FRANK O. PARKER.